(12) United States Patent
Chang

(10) Patent No.: US 12,564,275 B2
(45) Date of Patent: Mar. 3, 2026

(54) PET SLING CARRIER

(71) Applicant: JCMK GLOBAL, INC., Los Angeles, CA (US)

(72) Inventor: Jeffrey Chang, Los Angeles, CA (US)

(73) Assignee: JCMK GLOBAL, INC., Los Angeles, CA (US)

( * ) Notice: Subject to any disclaimer, the term of this patent is extended or adjusted under 35 U.S.C. 154(b) by 46 days.

(21) Appl. No.: 18/740,427

(22) Filed: Jun. 11, 2024

(65) Prior Publication Data

US 2025/0040726 A1 Feb. 6, 2025

Related U.S. Application Data

(60) Provisional application No. 63/530,559, filed on Aug. 3, 2023.

(51) Int. Cl.
*A47D 13/02* (2006.01)
*A01K 1/02* (2006.01)

(52) U.S. Cl.
CPC ............ *A47D 13/025* (2013.01); *A01K 1/029* (2013.01)

(58) Field of Classification Search
CPC .................................................... A47D 13/025
See application file for complete search history.

(56) References Cited

U.S. PATENT DOCUMENTS 4,436,233 A 3/1984 Hill et al.
4,458,834 A 7/1984 Rosen 4,579,264 A 4/1986 Napolitano
5,570,823 A 11/1996 Lindy
5,950,887 A 9/1999 Powell
6,311,884 B1 11/2001 Johnson
7,195,529 B1 * 3/2007 Crandall ................... B63C 9/08
441/106
9,198,525 B2 12/2015 Wernick et al.
9,314,112 B2 4/2016 Chuah
(Continued)

FOREIGN PATENT DOCUMENTS

CN 107174063 A * 9/2017 ............. A47D 13/02
CN 114587110 A * 6/2022 ........... A47D 13/025
(Continued)

OTHER PUBLICATIONS

Translation of JP2022175636 (Nov. 2022).*

*Primary Examiner* — Nathan J Newhouse
(74) *Attorney, Agent, or Firm* — Heedong Chae; Lucem, PC

(57) ABSTRACT

A carrier for securing and carrying a pet or a baby includes a connecting panel, first and second slings, and first and second adjustable straps. The first and second slings are fixedly attached to the connecting panel. When the carrier is worn, the connecting panel is centered vertically on the wearer's back whereas the first and second slings crisscross on their front torso. The slings are wide enough to hold a pet. Furthermore, the connecting panel includes a base panel, inner panel, and cover panel. The first and second slings and the first and second adjustable straps are each sewn in between the base panel and the inner panel, and the base panel and the cover panel are sewn together to cover the inner panel. The base panel includes a fabric cover, soft sponge, and mesh cover, with the soft sponge positioned between the fabric cover and mesh cover.

12 Claims, 18 Drawing Sheets

100

(56)                  References Cited

U.S. PATENT DOCUMENTS

| | | | |
|---|---|---|---|
| 9,986,775 | B2 | 6/2018 | Hamidi |
| 10,555,620 | B2 | 2/2020 | Gibbons |
| D877,490 | S * | 3/2020 | Daws ............................. D3/213 |
| 10,743,678 | B2 * | 8/2020 | Salazar ................... A45F 3/047 |
| 11,185,173 | B2 | 11/2021 | Gibbons |
| 2005/0051582 | A1 | 3/2005 | Frost |
| 2012/0260423 | A1 | 10/2012 | Charles |
| 2012/0286002 | A1 * | 11/2012 | Dardel ................. A47D 13/025 |
| | | | 224/159 |
| 2018/0078051 | A1 | 3/2018 | Mchugh |
| 2019/0125100 | A1 * | 5/2019 | Rothwell ............... A47D 13/02 |

FOREIGN PATENT DOCUMENTS

| | | | | | |
|---|---|---|---|---|---|
| DE | 102007022443 | A1 * | 3/2008 | .......... | A47D 13/025 |
| JP | 3132608 | U  * | 6/2007 | .......... | A47D 13/025 |
| JP | 2022175636 | A  * | 11/2022 | | |

* cited by examiner

100

100

100

30

30

31

40

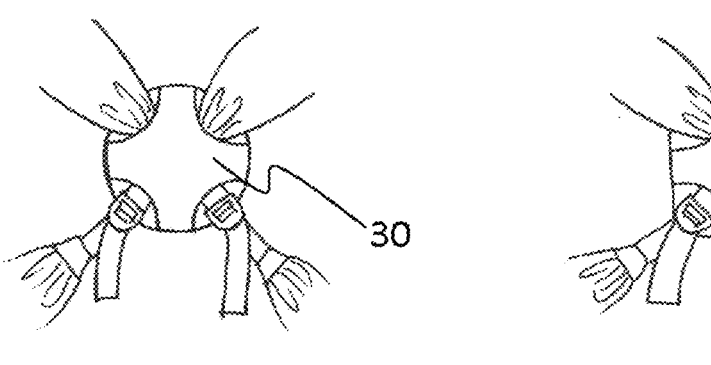
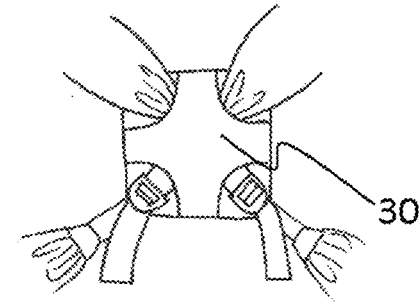
FIG. 7A
FIG. 7B
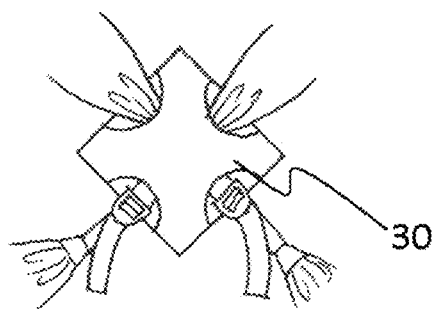
FIG. 7C
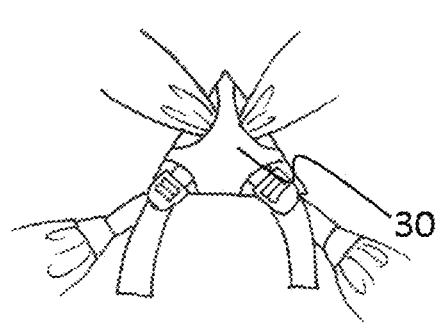
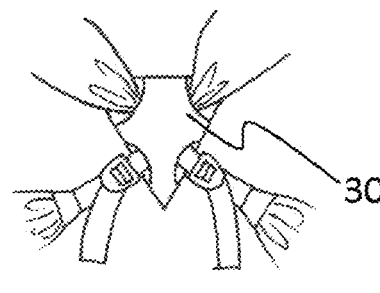
FIG. 7D
FIG. 7E

30'

100'

10

20

30'

50

40

PET SLING CARRIER

CROSS-REFERENCE TO RELATED APPLICATIONS

This application claims priority to U.S. provisional patent application No. 63/530,559 filed Aug. 3, 2023, which is incorporated herein by reference in its entirety.

FIELD OF THE INVENTION

The present invention relates to a sling carrier for securing and carrying a pet or a baby. Specifically, it includes a first sling, a second sling, and a connecting panel. The connecting panel is constructed to be centered vertically on the wearer's back, while the first and second slings crisscross on the front torso. The respective ends of the slings are fixedly attached to the connecting panel. Additionally, the carrier further includes first and second adjustable straps to tighten and secure the pet or baby within the slings.

BACKGROUND OF THE INVENTION

These days, many people treat their pets like their own children and often take them along for walks and travels. For small pets such as dogs and cats, there are plenty of bags, sling bags, and carriers available on the market that make it easy to carry them around. Sling bags that allow the user to carry the animal on one shoulder while keeping their hands free have gained popularity. However, using such bags for an extended period can cause pain in the user's shoulder and neck. Additionally, the pet may feel uncomfortable being tilted to one side during movement.

There are also sling bags designed to be worn on both shoulders, providing better weight distribution. However, these bags can be inconvenient to adjust for different pet sizes and may not stay balanced on both shoulders, leading to discomfort for both the user and the pet.

In order to address these issues and enhance the experience of carrying a pet, the present invention provides a new pet sling carrier. This innovative sling carrier features a first sling, a second sling, and a connecting panel that ensures the slings are centered vertically on the wearer's back. The first and second slings crisscross on the front torso, distributing the weight evenly across both shoulders, reducing strain on the shoulder and neck. The ends of the slings are securely attached to the connecting panel for added stability.

Additionally, the carrier includes first and second adjustable straps that allow for easy adjustment to accommodate pets of various sizes. These straps ensure that the pet is securely fastened within the slings, providing comfort and safety during movement. This structure not only enhances the comfort of the wearer but also ensures that the pet remains secure and comfortable, making it an ideal solution for pet owners who love to take their pets along on their adventures.

This invention is directed to solve above-mentioned problems and satisfy the long-felt need.

SUMMARY OF THE INVENTION

The present invention contrives to solve the disadvantages of the prior art. The present invention provides a sling carrier for securing and carrying a pet or a baby that includes a first sling, a second sling, and a connecting panel.

The object of the present invention is to provide a carrier for securing and carrying a pet or a baby, which includes a connecting panel, a first sling, a first adjustable strap, a second sling, and a second adjustable strap. The first end of the first sling is fixedly attached to an upper left part of the connecting panel whereas the first end of the second sling is fixedly attached to an upper right part of the connecting panel. The first end of the first adjustable strap is fixedly attached to the second end of the first sling, and the second end of the first adjustable strap is fixedly attached to a lower right part of the connecting panel. In addition, the first end of the second adjustable strap is fixedly attached to the second end of the second sling, and the second end of the second adjustable strap is fixedly attached to a lower left part of the connecting panel.

The connecting panel is constructed to be symmetrical with respect to a vertical axis, and the first and second slings are constructed to criss-cross each other. The first and second adjustable straps are length-adjustable. Furthermore, the first and second slings are approximately the same length, and the first and second adjustable straps are approximately the same length as well when fully extended.

The first and second slings are approximately the same width and made of cotton fabric. The first and second slings are wide enough to wrap around the pet or baby. The slings are wide enough to comfortably hold a pet or baby and distribute their weight evenly across the wearer's shoulders.

In addition, the connecting panel includes a base panel, an inner panel, and a cover panel. The first end of the first sling, the first end of the second sling, the second end of the first adjustable strap, and the second end of the second adjustable strap are each sewn in between the base panel and the inner panel, and the base panel and the cover panel are sewn together to cover the inner panel. Furthermore, the base panel includes a fabric cover, a soft sponge, and a mesh cover, with the soft sponge positioned between the fabric cover and the mesh cover.

Another object of the present invention is to provide a carrier for securing and carrying a pet or a baby, which includes a connecting geometric ring, a first sling, a first adjustable strap, a second sling, and a second adjustable strap. The first end of the first sling is attached to an upper left part of the connecting geometric ring, and the first end of the second sling is attached to an upper right part of the connecting geometric ring. The first end of the first adjustable strap is fixedly attached to the second end of the first sling, and the second end of the first adjustable strap is attached to a lower right part of the connecting geometric ring. In addition, the first end of the second adjustable strap is fixedly attached to the second end of the second sling, and the second end of the second adjustable strap is attached to a lower left part of the connecting geometric ring.

The connecting geometric ring is constructed to be symmetrical with respect to a vertical axis, and may be made of steel, plastic, aluminum, or the like. The first and second slings are constructed to criss-cross each other, and the first and second adjustable straps are length-adjustable.

The connecting geometric ring 30' may be constructed to have a shape of a kite quadrilateral. Alternatively, the connecting geometric ring may be constructed to have a shape of a square, a circle, or a triangle.

Still another object of the present invention is to provide a method for wearing the carrier and securing and carrying a pet or a baby. The method includes the steps of: pulling the carrier over a head of a wearer such that the connecting panel is centered vertically on a back of the wearer and the first and second slings crisscross on a front torso of the wearer; and placing the pet or the baby in the second sling and covering the pet or the baby with the first sling. The method further includes the steps of: spreading the first and second slings over respective shoulders of the wearer like a shawl; adjusting tightness of the first and second adjustable straps by pulling down the free ends of the first and second adjustable straps; and folding the free ends and securing the folded free ends respectively in loops.

The advantages of the present invention are: (1) Minimized Separation Anxiety: the pet sling carrier of the present invention promotes close contact between the pet and the owner, minimizing dog separation anxiety and fostering a strong bond; (2) Hands-Free Convenience: pet owners can wear the carrier of the present invention like a T-shirt, keeping their hands free while carrying their pets; (3) Even Weight Distribution: the carrier's weight distribution structure of the present invention evenly spreads the pet's weight, reducing stress and discomfort for the pet owner; (4) Ease of Use: the carrier is simple and quick to put on and take off the carrier of the present invention, making it convenient for pet owners on the move; (5) Unisex and Adjustable Structure: the carrier of the present invention is adjustable, ensuring a comfortable fit for all pet owners regardless of their body size; (6) Ergonomic Support: the carrier of the present invention incorporates an ergonomic weight distribution system, evenly distributing the pet's weight across the pet owner's body to reduce strain on the neck, shoulders, and waist; (7) Adjustable Straps: the carrier of the present invention features adjustable straps to ensure a proper and secure fit for pet owners of varying body types; (8) Enhanced Comfort: the connecting panel of the present invention is equipped with air mesh and soft sponge padding to enhance air circulation and provide additional support and comfort to the pet owner; and (9) Neat and Organized Appearance: the present invention includes built-in strap organizers to prevent dangling straps, ensuring a neat and organized appearance.

Although the present invention is briefly summarized, the fuller understanding of the invention can be obtained by the following drawings, detailed description and appended claims.

BRIEF DESCRIPTION OF THE DRAWINGS

These and other features, aspects and advantages of the present invention will become better understood with reference to the accompanying drawings, wherein:

FIGS. 7A, 7B, 7C, 7D, and 7E show various shapes of the connecting panel;

DETAILED DESCRIPTION OF EMBODIMENTS OF THE INVENTION

Reference will now be made in detail to the preferred embodiments of the present invention, examples of which are illustrated in the accompanying drawings, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

Also, as used in the specification including the appended claims, the singular forms "a", "an", and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about", it will be understood that the particular value forms another embodiment.

Figure 1A:
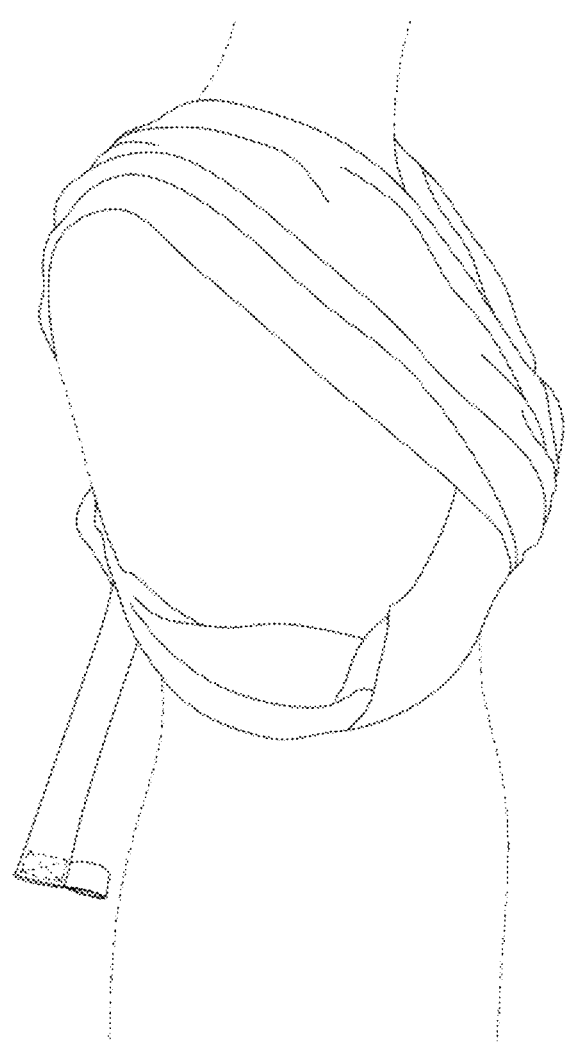
FIGS. 1A, 1B, and 1C show perspective, front, and rear views of the sling carrier worn by a wearer according to the present invention.
Figure 1B:
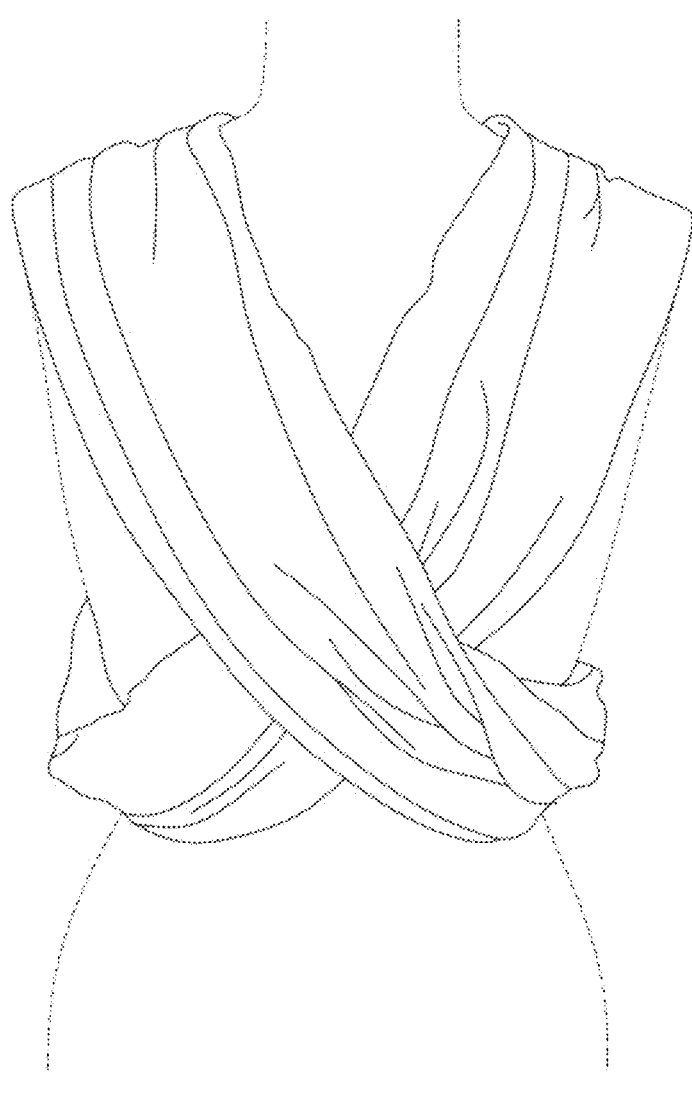
Figure 1C:
Figure 1C:
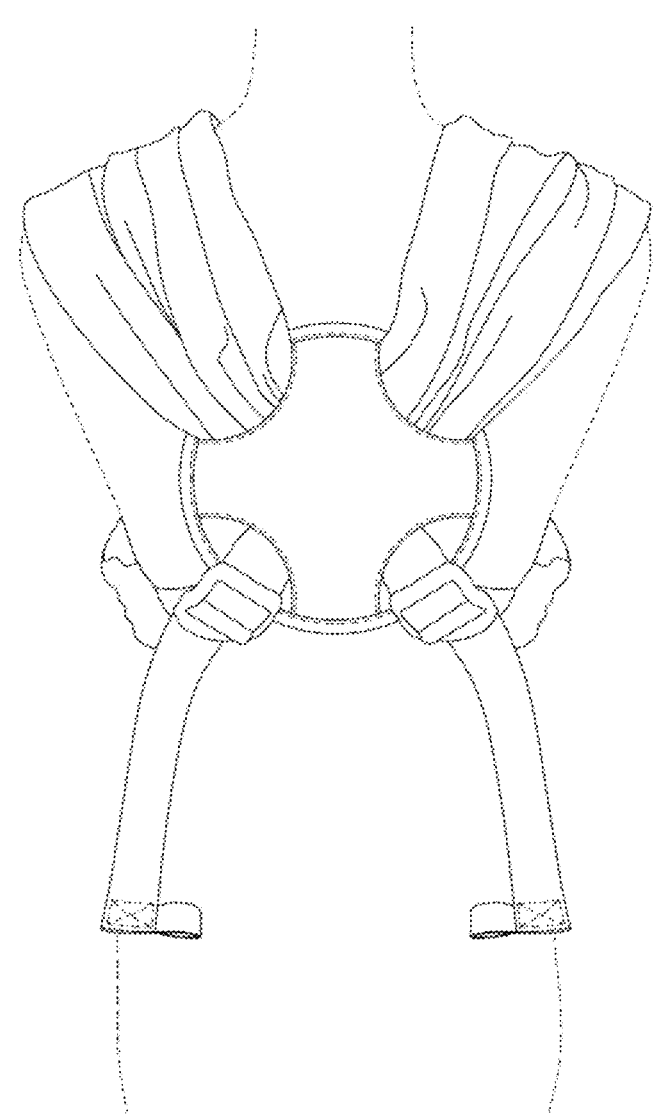
Figure 2:
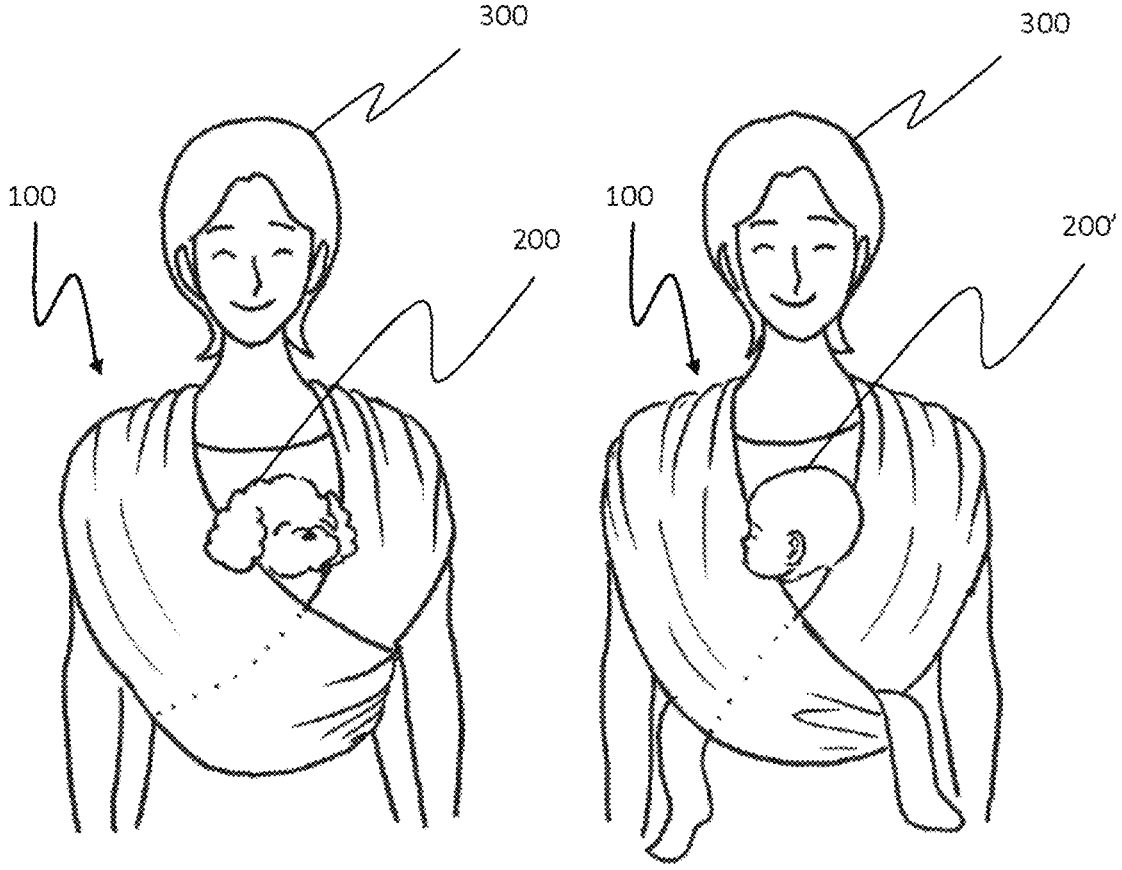
FIG. 2 shows front views of the wearer using the sling carrier: one view with a pet in the carrier and another with a baby in the carrier according to the present invention.
Figure 3:
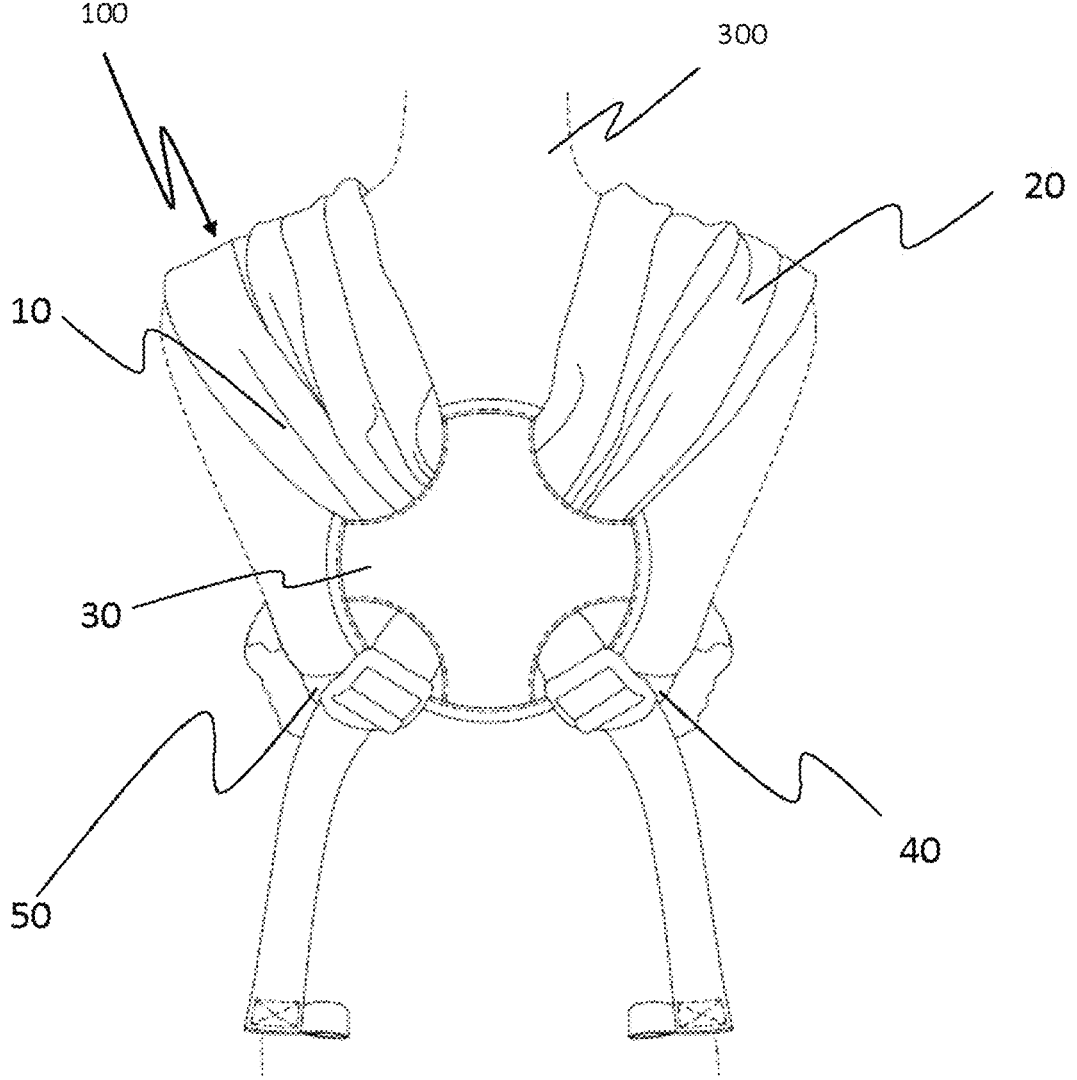
FIG. 3 shows a rear view of the wearer using the sling carrier according to the present invention.

FIGS. 1A, 1B, and 1C show perspective, front, and rear views of the sling carrier 100 worn by a wearer 300 according to the present invention. FIG. 2 shows front views of the wearer 300 using the sling carrier 100, one view with a pet in the carrier and another with a baby in the carrier according to the present invention, and FIG. 3 shows a rear view of the wearer 300 using the sling carrier 100.

The carrier 100 of the present invention for securing and carrying a pet 200 or a baby 200' includes a connecting panel 30, a first sling 10, a first adjustable strap 40, a second sling 20, and a second adjustable strap 50. The first sling 10 has a first end 11 and a second end 12, and the second sling 20 has a first end 21 and a second end 22. In addition, the first adjustable strap 40 having a first end 41 and a second end 42, and the second adjustable strap 50 has a first end 51 and a second end 52.

The first end 11 of the first sling 10 is fixedly attached to an upper left part of the connecting panel 30, and the first end 21 of the second sling 20 is fixedly attached to an upper right part of the connecting panel 30. The first end 41 of the first adjustable strap 40 is fixedly attached to the second end 12 of the first sling 10, and the second end 42 of the first adjustable strap 40 is fixedly attached to a lower right part of the connecting panel 30. In addition, the first end 51 of the second adjustable strap 50 is fixedly attached to the second end 22 of the second sling 20, and the second end 52 of the second adjustable strap 50 is fixedly attached to a lower left part of the connecting panel 30.

The connecting panel 30 is constructed to be symmetrical with respect to a vertical axis, and the first and second slings 10, 20 are constructed to criss-cross each other. The first and second adjustable straps 40, 50 are length-adjustable. The slings 10, 10 may be constructed using a blend of 95% soft, breathable cotton fabric and 5% elastic spandex. This combination creates a comfortable environment for pets 200, providing both flexibility and ease of use. The inclusion of elastic spandex ensures the slings 10, 20 remain flexible and comfortable.

The first and second slings 10, 20 may be approximately the same length, and the first and second adjustable straps 40, 50 may be approximately the same length when fully extended.

The first and second slings 10, 20 are approximately the same width and made of cotton fabric. The first and second slings 10, 20 are wide enough to wrap around the pet 200 or the baby 200'. The slings 10, 20 are wide enough to comfortably hold a pet 200 or a baby 200' and distribute their weight evenly across the wearer's shoulders.

Figure 4A:
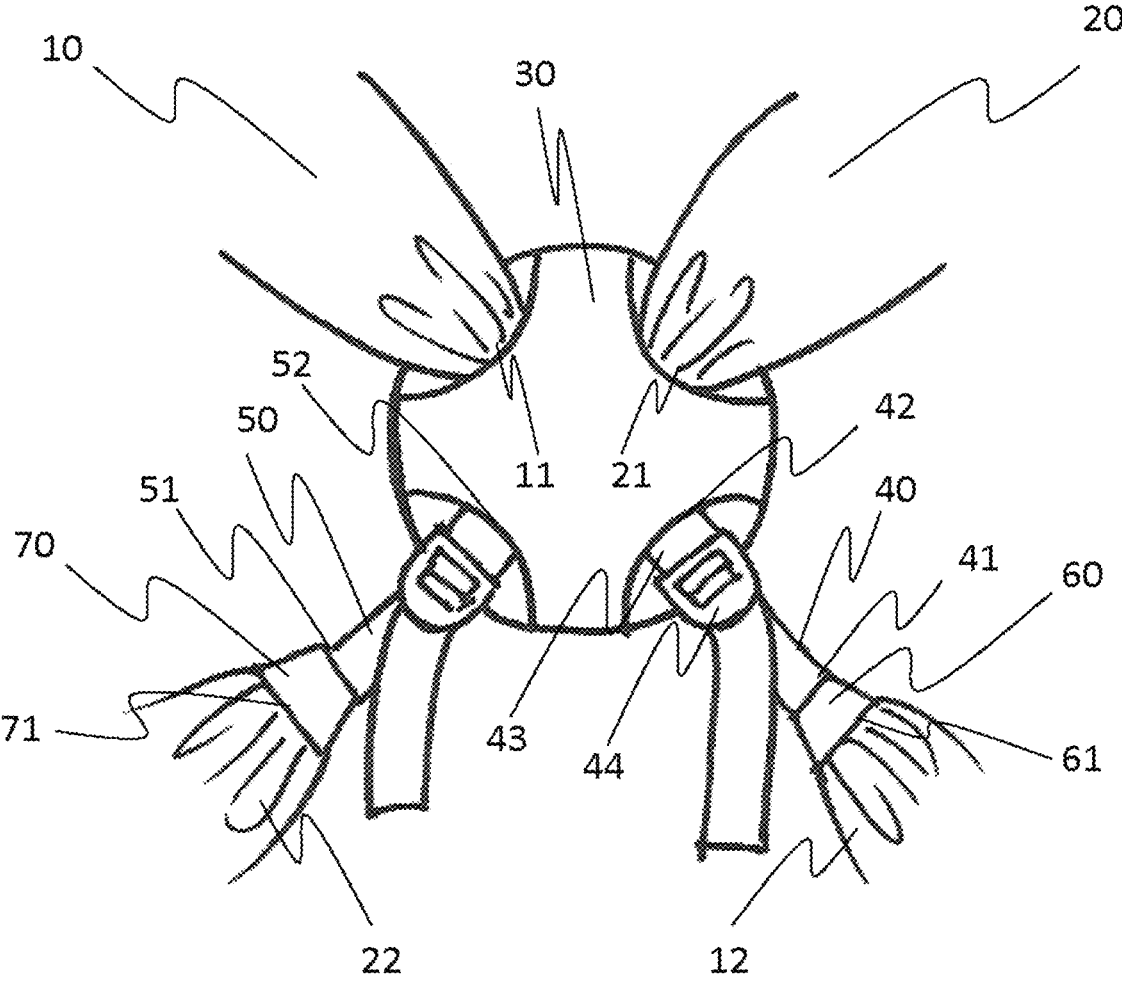
FIGS. 4A and 4B show front and rear views of the connecting panel, where the first and second slings and the first and second adjustable straps are attached to the connecting panel, according to the present invention.
Figures 4B, 4C:
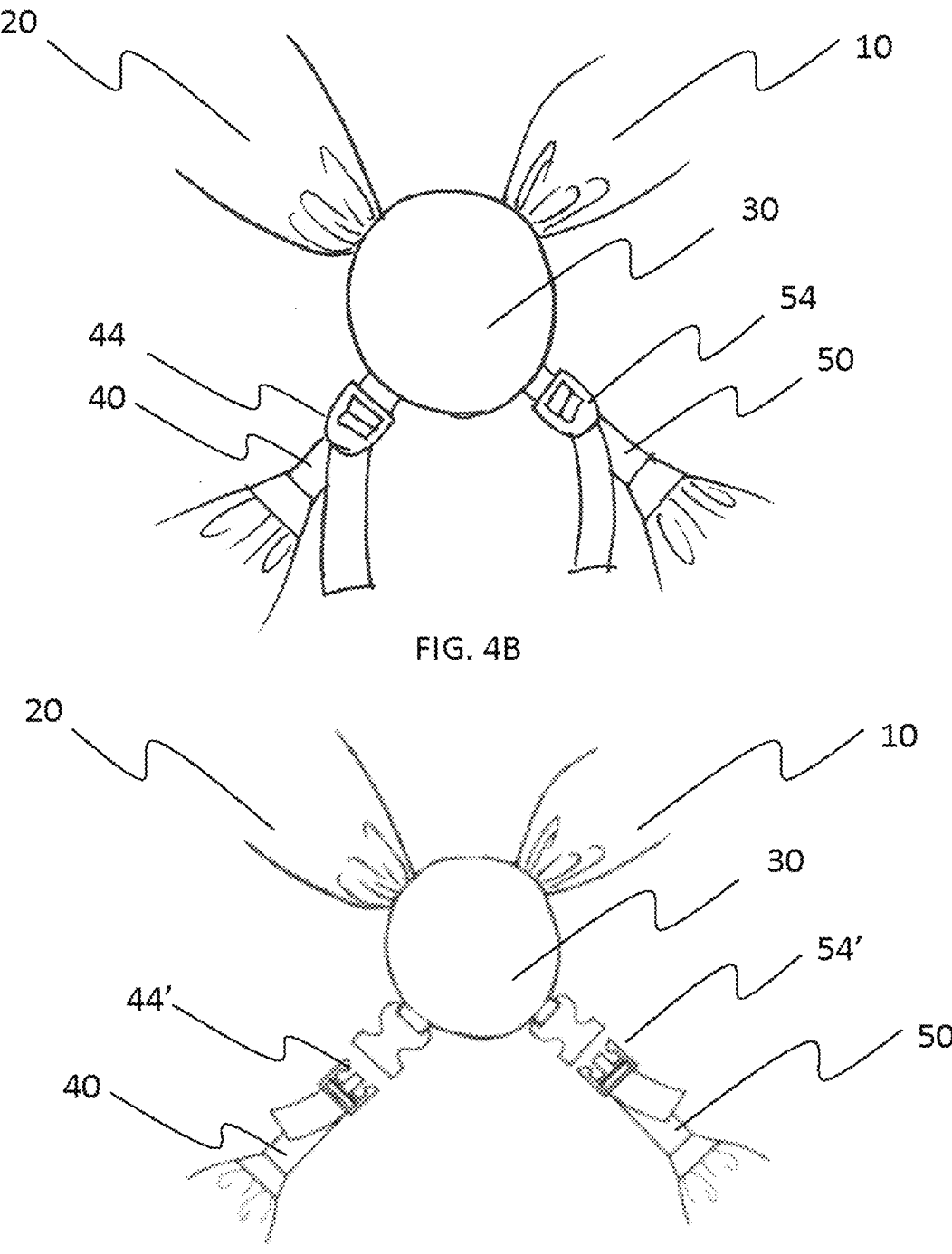
FIG. 4C shows another view of the connecting panel, illustrating a different type of buckle where the male part snaps into and can be released from the female part according to the present invention.
Figure 5A:
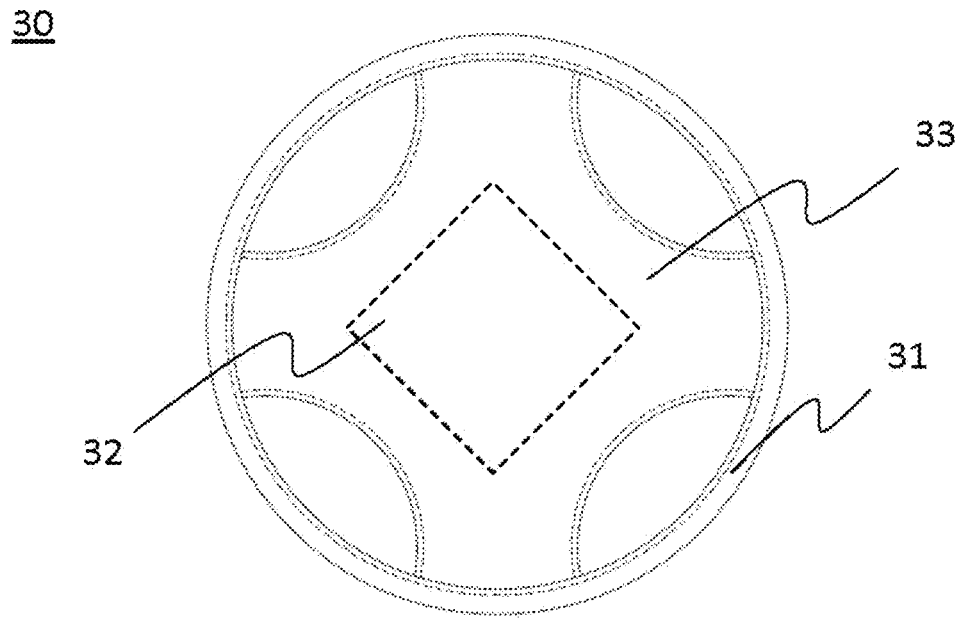
FIGS. 5A and 5B show front and rear views of the connecting panel according to the present invention.
Figure 5B:
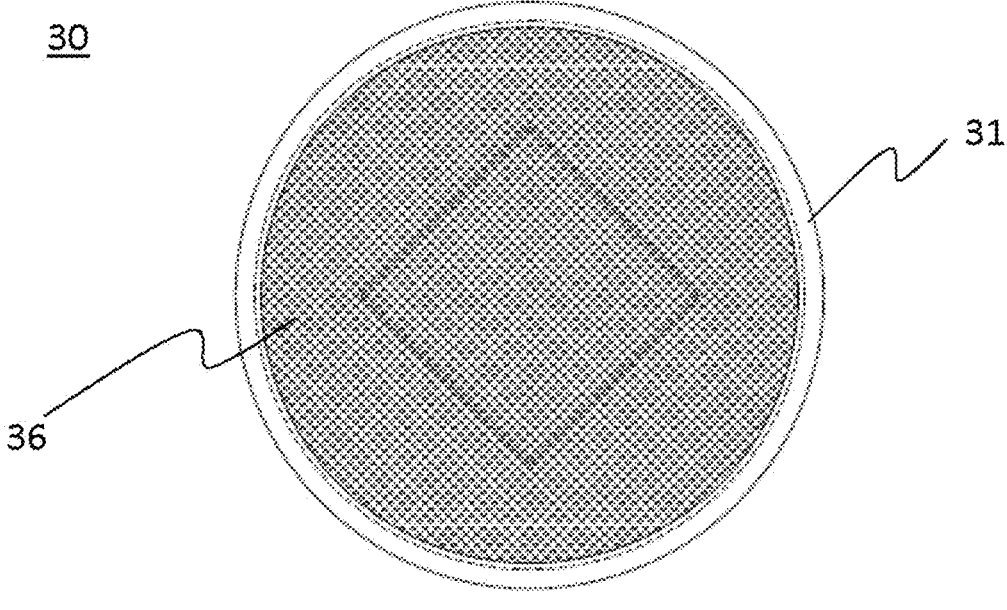
Figure 5C:
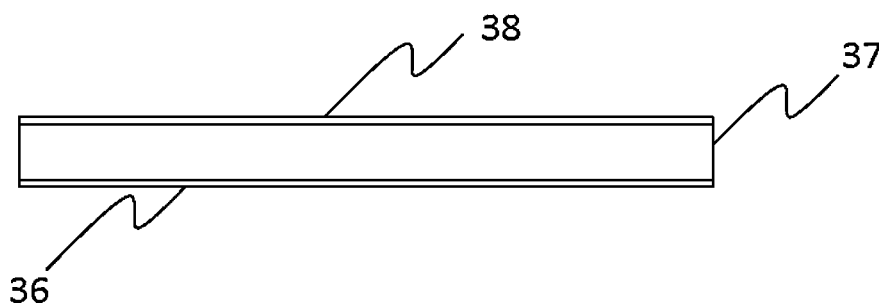
FIG. 5C shows a schematic sectional view of the connecting panel, illustrating the layers of the connecting panel according to the present invention.

FIGS. 4A and 4B show front and rear views of the connecting panel 30, where the first and second slings 10, 20 and the first and second adjustable straps 40, 50 are attached to the connecting panel 30. FIG. 4C shows another view of the connecting panel 30 with a buckle 44', 54', illustrating a different type of buckle 44', 54' where the male part snaps into and can be released from the female part. In addition, 5A and 5B show front and rear views of the connecting panel 30, and FIG. 5C shows a schematic sectional view of the connecting panel 30, illustrating the layers 36, 37, 38 of the connecting panel 30.

In addition, the connecting panel 30 includes a base panel 31, an inner panel 32, and a cover panel 33. The first end 11 of the first sling 10, the first end 21 of the second sling 20, the second end 41 of the first adjustable strap 40, and the second end 51 of the second adjustable strap 50 are each sewn in between the base panel 31 and the inner panel 32, and the base panel 31 and the cover panel 33 are sewn together to cover the inner panel 32. The base panel 31 includes a fabric cover 38, a soft sponge 37, and a mesh cover 36, with the soft sponge 37 positioned between the fabric cover 38 and the mesh cover 36, and the fabric cover 38, the soft sponge 37, and the mesh cover 36 are sewn together in such a way to enable the mesh cover 36 to face the back of a wearer 300. Here, a "soft sponge" refers to a type of cushioning material that is soft, flexible, and used for padding. It serves as a layer to provide comfort and support and can be made from various materials such as foam or other synthetic materials designed to be soft and resilient. The mesh cover is made of airflow mesh material to promote ventilation, ensuring a dry carrying experience.

Figure 6A:
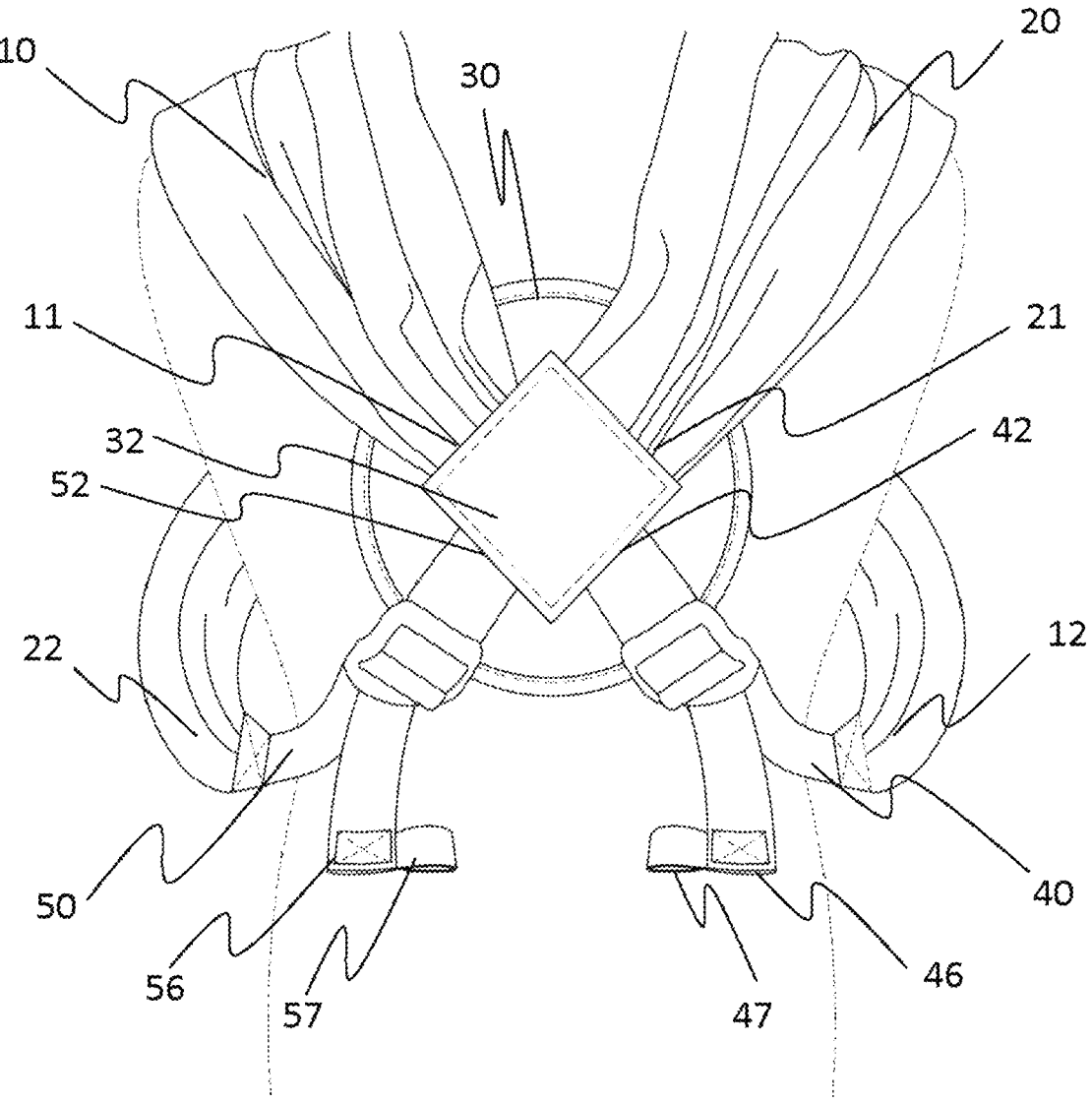
FIG. 6A shows another view of the connecting panel, where the first and second slings and the first and second adjustable straps are attached to the connecting panel, according to the present invention.
Figure 6B:
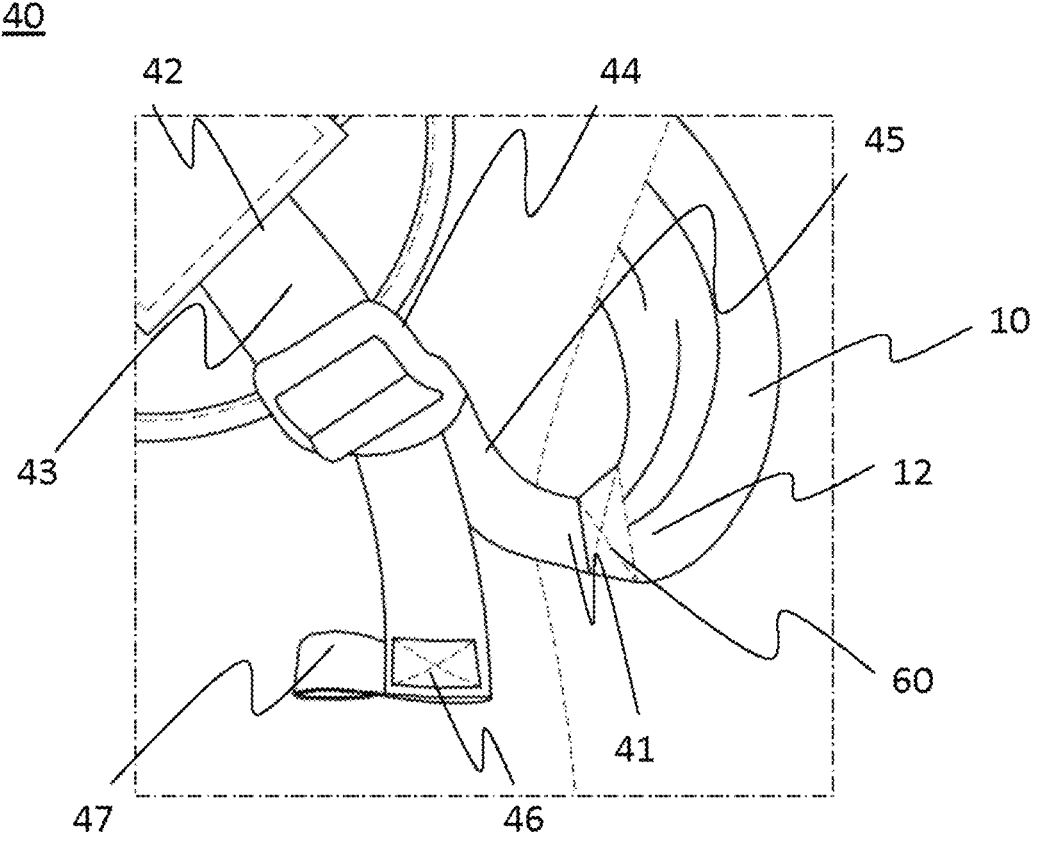
FIG. 6B shows an enlarged view of the adjustable strap attached to the connecting panel and sling according to the present invention.
Figure 6C:
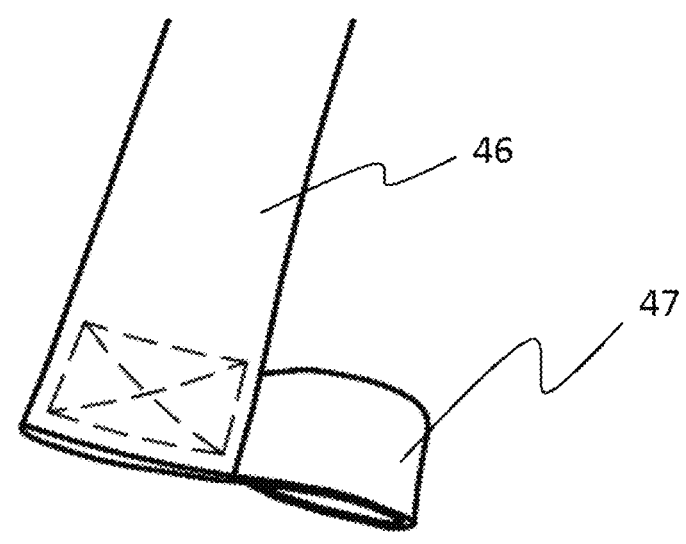
FIG. 6C shows the free end of the adjustable strap portion of the adjustable strap and the loop vertically extending from the free end.
Figure 6D:
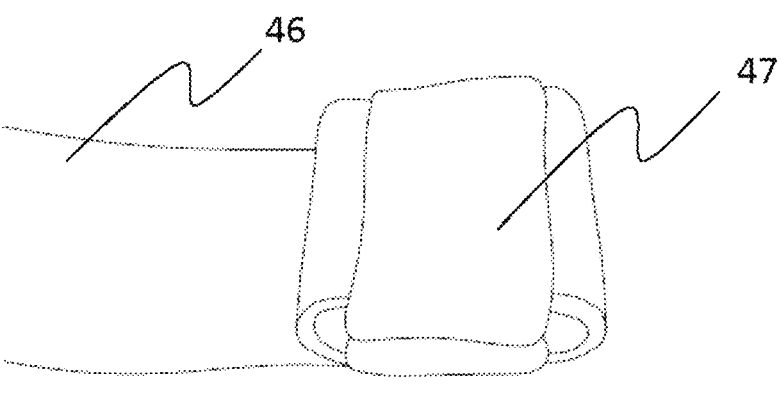
FIG. 6D shows the free end folded and received in the loop according to the present invention.
Figures 8A, 8B, 8C, 8D:
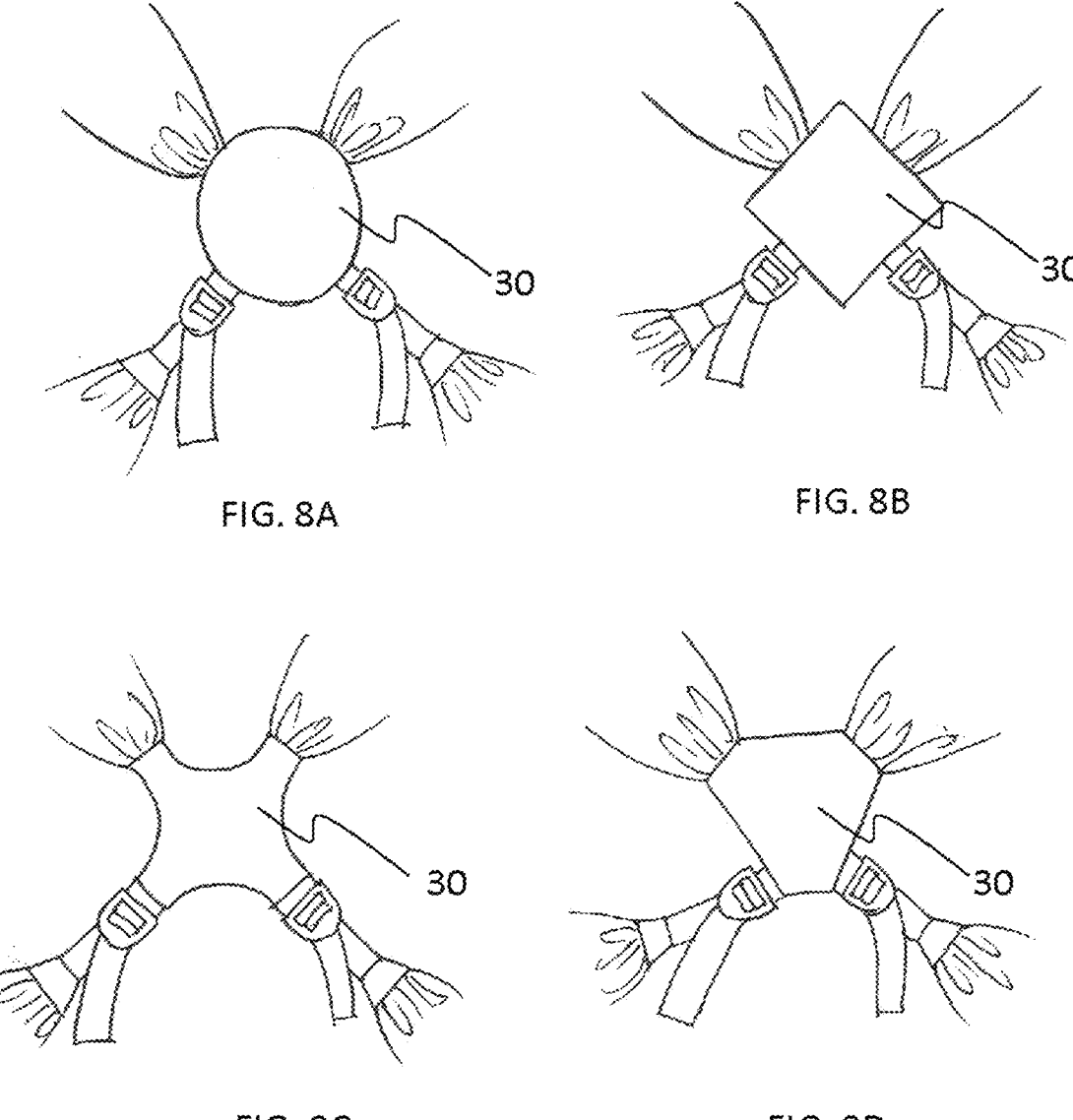
FIGS. 8A, 8B, 8C, and 8D show another various shapes of the connecting panel.

FIG. 6A shows the connecting panel 30, where the first and second slings 10, 20 and the first and second adjustable straps 40, 50 are attached to the connecting panel 30. FIG. 6B shows an enlarged view of the adjustable strap 50 attached to the connecting panel 30 and sling 20. In addition, FIG. 6C shows the free end 46 of the adjustable strap portion 45 of the adjustable strap 40 and the loop 47 vertically extending from the free end 46. FIG. 6D shows the free end 46 folded and received in the loop 47.

The first end 11 of the first sling 10 is loosely folded, stacked, and then sewn to upper left part of the connecting panel 30, and likewise, the first end 21 of the second sling 20 is loosely folded, stacked, and then sewn to upper right part of the connecting panel 30, the slings 10, 20 radiating out from the connecting panel 30.

The carrier 100 further comprises a first attachment part 60 and a second attachment part 70. The second end 12 of the first sling 10 is loosely folded, stacked, and then sewn to one end 61 of the first attachment part 60, and the first end 41 of the first adjustable strap 40 is sewn to the opposite end of the first attachment part 60. Likewise, the second end 22 of the second sling 20 is loosely folded, stacked, and then sewn to one end of the second attachment part 70, and the first end 51 of the second adjustable strap 50 is sewn to the opposite end of the second attachment part 70. As a result, the slings 10, 20 respectively radiate out from the attachment parts 60, 70.

When both ends 11 and 12 of the first sling 10 are sewn respectively to be attached to the connecting pad 30 and the first adjustable strap 40, the sides of the ends 11, 12 are folded inwardly to face each other. This causes the first sling to form a shape resembling a ship, creating a space designed to hold a pet 200 or a baby 200'. Likewise, when both ends 21 and 22 of the second sling 20 are sewn respectively to be attached to the connecting pad 30 and the second adjustable strap 50, the sides of the ends 21, 22 are folded inwardly to face each other. This causes the second sling 20 to form a shape resembling a ship, creating a space designed to hold a pet 200 or a baby 200'.

The first adjustable strap 40 includes a fixed strap portion 43, an adjustable strap portion 45, and a buckle 44. The fixed strap portion 43 of the first adjustable strap 40 is secured to the buckle 44 to maintain a constant length, whereas the adjustable strap portion 45 of the first adjustable strap 40 is threaded through the buckle 44 to allow for length adjustment by pulling a free end 46 of the adjustable strap portion 45 of the first adjustable strap 40. The fixed strap portion 43 passes through one of the slots in the buckle 44 and is stitched back onto itself and the connecting panel 30 to ensure it remains securely attached. To adjust the length, the free end 46 of the adjustable strap 45 is pulled through the buckle 44. The friction created by the threading through the buckle 44 and over the bar of the buckle 44 keeps the adjustable strap 45 from slipping unintentionally. This is only an example, and other structures of adjustable strap portion 45 and buckle 44 may be used. For example, an additional lever or cam may be used to be pressed down to clamp the adjustable strap portion 45 more securely, ensuring it doesn't slip.

The adjustable strap portion 45 of the first adjustable strap 40 is fixedly attached to the second end 12 of the first sling 10, and the fixed portion 43 of the first adjustable strap 40 is fixedly attached to a lower right part of the connecting panel 30 such that the free end 46 of the adjustable strap portion 45 of the first adjustable strap 40 hangs downwardly from the buckle 44 of the first adjustable strap 40. In this construction, the wearer can easily reach the free end 46 of the adjustable strap portion 45 to pull it down.

Similarly, as shown in FIG. 6A, the second adjustable strap 50 includes a fixed strap portion 53, an adjustable strap portion 55, and a buckle 54. The fixed strap portion 53 of the second adjustable strap 50 is secured to the buckle 54 to maintain a constant length, whereas the adjustable strap portion 55 of the second adjustable strap 50 is threaded through the buckle 54 to allow for length adjustment by pulling a free end 56 of the adjustable strap portion 55 of the second adjustable strap 50. The fixed strap portion 53 passes through one of the slots in the buckle 54 and is stitched back onto itself and the connecting panel 30 to ensure it remains securely attached. To adjust the length, the free end 56 of the adjustable strap 55 is pulled through the buckle 54. The friction created by the threading through the buckle 54 and over the bar of the buckle 54 keeps the adjustable strap 55 from slipping unintentionally.

This is only an example, and other structures of adjustable strap portion 55 and buckle 54 may be used. For example, an additional lever or cam may be used to be pressed down to clamp the adjustable strap portion 55 more securely, ensuring it doesn't slip.

The adjustable strap portion 55 of the second adjustable strap 50 is fixedly attached to the second end 22 of the second sling 20, and the fixed portion 53 of the second adjustable strap 50 is fixedly attached to a lower left part of the connecting panel 30 such that the free end 56 of the adjustable strap portion 55 of the second adjustable strap 50 hangs downwardly from the buckle 54 of the second adjustable strap 50. In this construction, the wearer can easily reach the free end 56 of the adjustable strap portion 55 to pull it down.

As shown in FIG. 6A, the first adjustable strap 40 further includes a first loop 47 which is vertically sewn to the free end 46 of the adjustable strap portion 45 of the first adjustable strap 40. The first loop 47 has a length approximately twice of the width of the free end 46, allowing the free end 46 to be folded and then secured by folding the loop 47 back to encase the folded free end 46. The loop 47, made of elastic material, functions as a strap organizer to prevent the free end 46 from dangling. Furthermore, because the loop 47 is vertically attached to the free end 46, it helps prevent the free end 46 from slipping out of the buckle 44. The strap organizer keeps the excess length of the strap 45 tidy and secure, preventing it from dangling or getting in the way. By using the strap organizer, the wearer 300 can adjust the strap 45 to the desired length and then tuck any excess strap into the organizer, maintaining a neat appearance and enhancing safety by reducing the risk of tripping or snagging.

Similarly to the first adjustable strap 40, as shown in FIG. 6A, the second adjustable strap 50 includes a second loop 57 which is vertically sewn to the free end 56 of the adjustable strap portion 55 of the second adjustable strap 50. The second loop 57 has a length approximately twice of the width of the free end 56, allowing the free end 56 to be folded and then secured by folding the loop 57 back to encase the folded free end 56.

FIGS. 7A, 7B, 7C, 7D, and 7E show various shapes of the connecting panel, and FIGS. 8A, 8B, 8C, and 8D show another various shapes of the connecting panel where the slings 10, 20 and adjustable straps 40 are attached to (upper left/right and lower left/right) sides of the connecting panel 30.

Figure 9A:
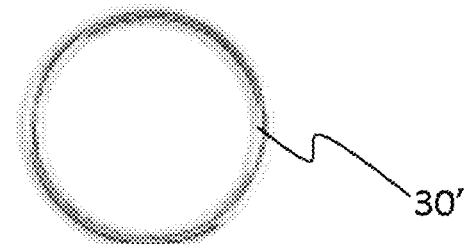
FIGS. 9A and 9B show the connecting geometric ring in the shape of a circle.
Figure 9B:
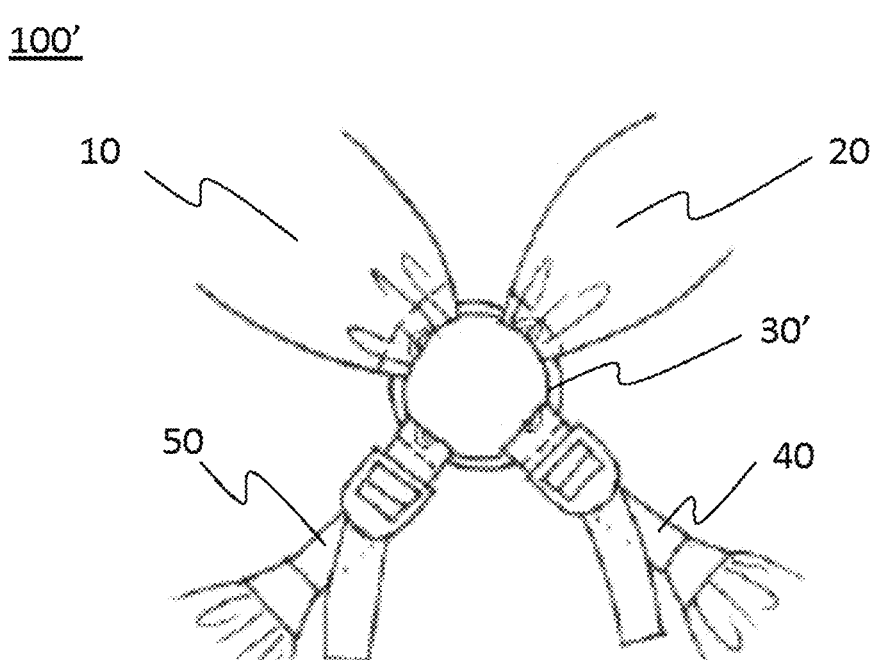
Figure 10A:
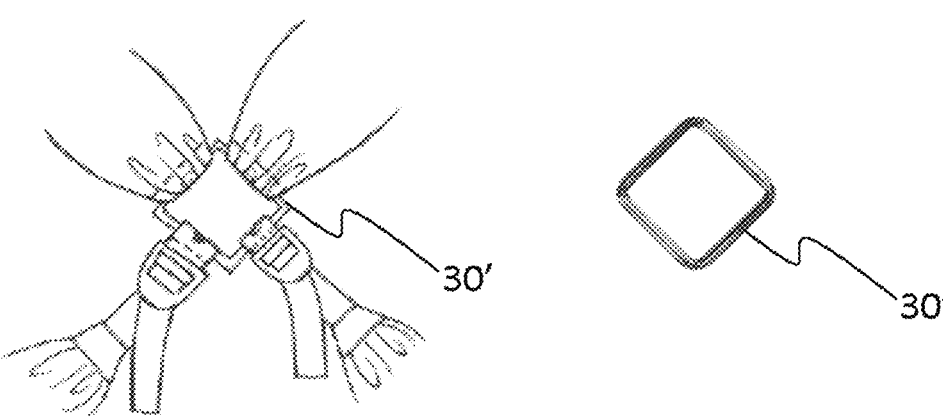
FIGS. 10A, 10B, and 10C show the connecting geometric ring respectively in the shapes of a square, circle, and triangle.
Figure 10B:
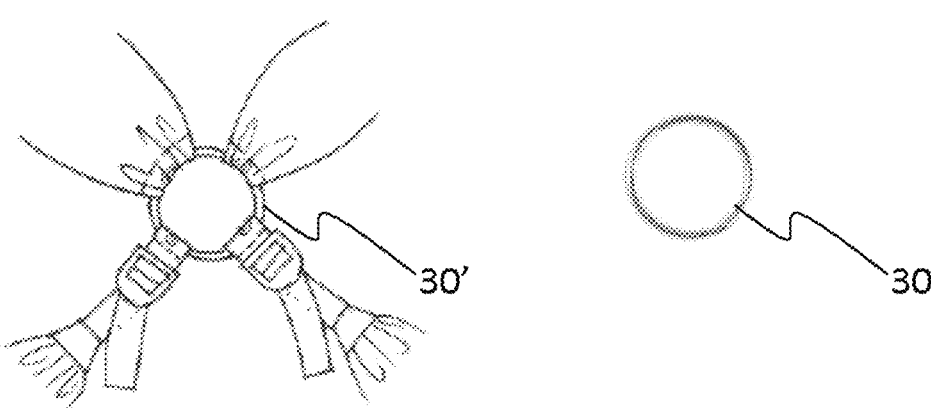
Figure 10C:
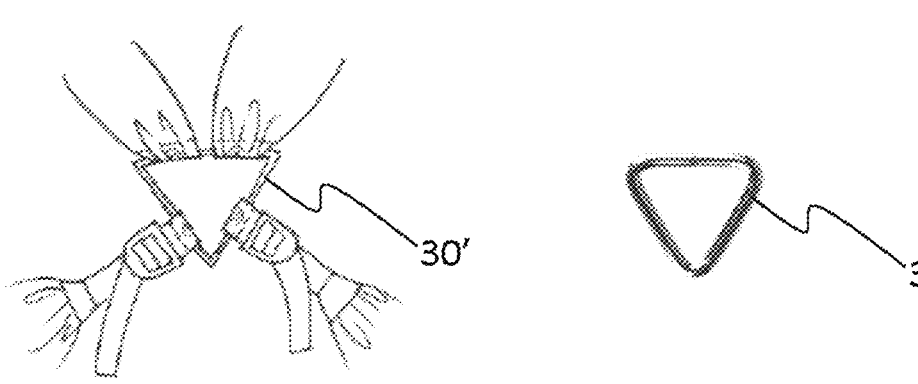
Figures 11A, 11B, 11C:
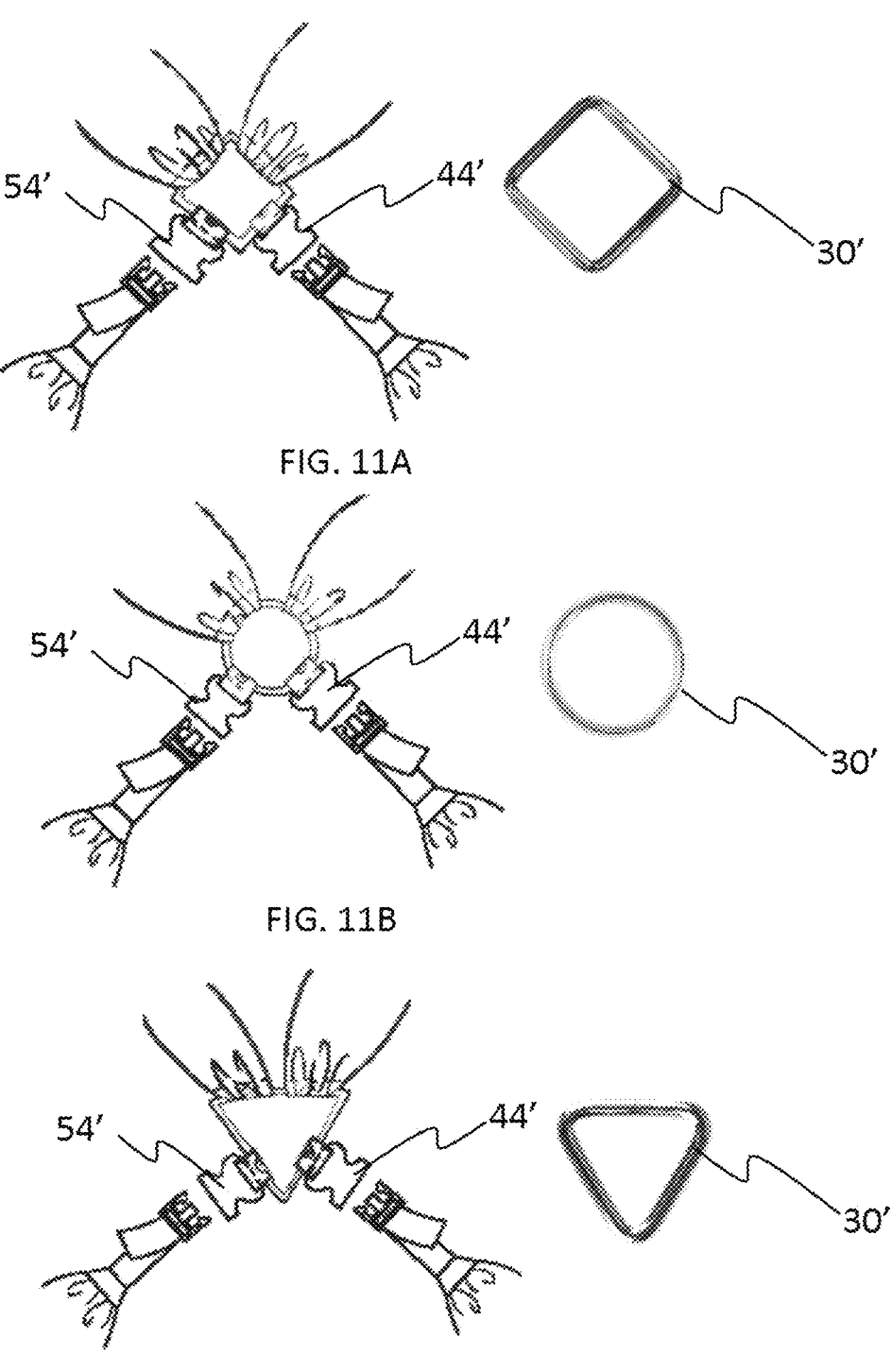
FIGS. 11A, 11B, and 11C show the connecting geometric ring respectively in the shapes of a square, circle, and triangle, illustrating detachable buckles.

In the alternative embodiments, the connecting panel 30 may be replaced with a connecting geometric ring 30'. FIGS. 9A and 9B show the connecting geometric ring 30' in the shape of a circle, and FIGS. 10A, 10B, and 10C show the connecting geometric ring 30' respectively in the shapes of a square, circle, and triangle. In addition, FIGS. 11A, 11B, and 11C show the connecting geometric ring 30' respectively in the shapes of a square, circle, and triangle, illustrating detachable buckles.

In these embodiments, the carrier 100' of the present invention for securing and carrying a pet 200 or a baby 200' includes a connecting geometric ring 30', a first sling 10, a first adjustable strap 40, a second sling 20, and a second adjustable strap 50. The first sling 10 has a first end 11 and a second end 12, and the second sling 20 has a first end 21 and a second end 22. In addition, the first adjustable strap 40 has a first end 41 and a second end 42, and the second adjustable strap 50 has a first end 51 and a second end 52.

The first end 11 of the first sling 10 is attached to an upper left part of the connecting geometric ring 30', and the first end 21 of the second sling 20 is attached to an upper right part of the connecting geometric ring 30'. The first end 41 of the first adjustable strap 40 is fixedly attached to the second end 12 of the first sling 10, and the second end 42 of the first adjustable strap 40 is attached to a lower right part of the connecting geometric ring 30'. In addition, the first end 51 of the second adjustable strap 50 is fixedly attached to the second end 22 of the second sling 20, and the second end 52 of the second adjustable strap 50 is attached to a lower left part of the connecting geometric ring 30'.

The connecting geometric ring 30' is constructed to be symmetrical with respect to a vertical axis, and may be made of steel, plastic, aluminum, or the like. The first and second slings 10, 20 are constructed to criss-cross each other, and the first and second adjustable straps 40, 50 are length-adjustable.

The connecting geometric ring 30' may be constructed to have a shape of a kite quadrilateral. Here, the kite quadrilateral is defined as a quadrilateral with two distinct pairs of adjacent sides that are equal in length. This means that one pair of opposite angles is equal, and it has an axis of symmetry along the line that connects the unequal pairs of sides. Alternatively, the connecting geometric ring 30' may be constructed to have a shape of a square, a circle, or a triangle.

The first and second slings 10, 20 are approximately the same length, and the first and second adjustable straps 40, 50 are approximately the same length when fully extended. The first and second slings 10, 20 are approximately the same width and made of cotton fabric, and the first and second slings 10, 20 are wide enough to wrap around the pet 200 or the baby 200'.

The first end 11 of the first sling 10 is loosely folded, stacked, and then sewn to upper left part of the connecting geometric ring 30', and the first end 21 of the second sling 20 is loosely folded, stacked, and then sewn to upper right part of the connecting geometric ring 30'.

The carrier 100 further comprises a first attachment part 60 and a second attachment part 70. The second end 12 of the first sling 10 is loosely folded, stacked, and then sewn to one end of the first attachment part 60, and the first end 41 of the first adjustable strap 40 is sewn to the opposite end of the first attachment part 60, and likewise, the second end 22 of the second sling 20 is loosely folded, stacked, and then sewn to one end of the second attachment part 70, and the first end 51 of the second adjustable strap 50 is sewn to the opposite end of the second attachment part 70.

The first adjustable strap 40 comprises a fixed strap portion 43, an adjustable strap portion 45, and a buckle 44. The fixed strap portion 43 of the first adjustable strap 40 is secured to the buckle 44 to maintain a constant length, and the adjustable strap portion 45 of the first adjustable strap 40 is threaded through the buckle 44 to allow for length adjustment by pulling a free end 46 of the adjustable strap portion 45 of the first adjustable strap 40. Furthermore, the adjustable strap portion 45 of the first adjustable strap 40 is fixedly attached to the second end 12 of the first sling 10 and the fixed portion 43 of the first adjustable strap 40 is attached to a lower right part of the connecting geometric ring 30' such that the free end 46 of the adjustable strap portion 45 of the first adjustable strap 40 hangs downwardly from the buckle 44 of the first adjustable strap 40.

The first adjustable strap 40 further comprises a first loop 47 which is vertically sewn to the free end 46 of the adjustable strap portion 45 of the first adjustable strap 40, wherein the first loop 47 has a length approximately twice of the width of the free end 46. Furthermore, the second adjustable strap 50 has the same structure as the first adjustable strap 40, having a fixed strap portion 53, an adjustable strap portion 55, and a buckle 54.

Figure 12:
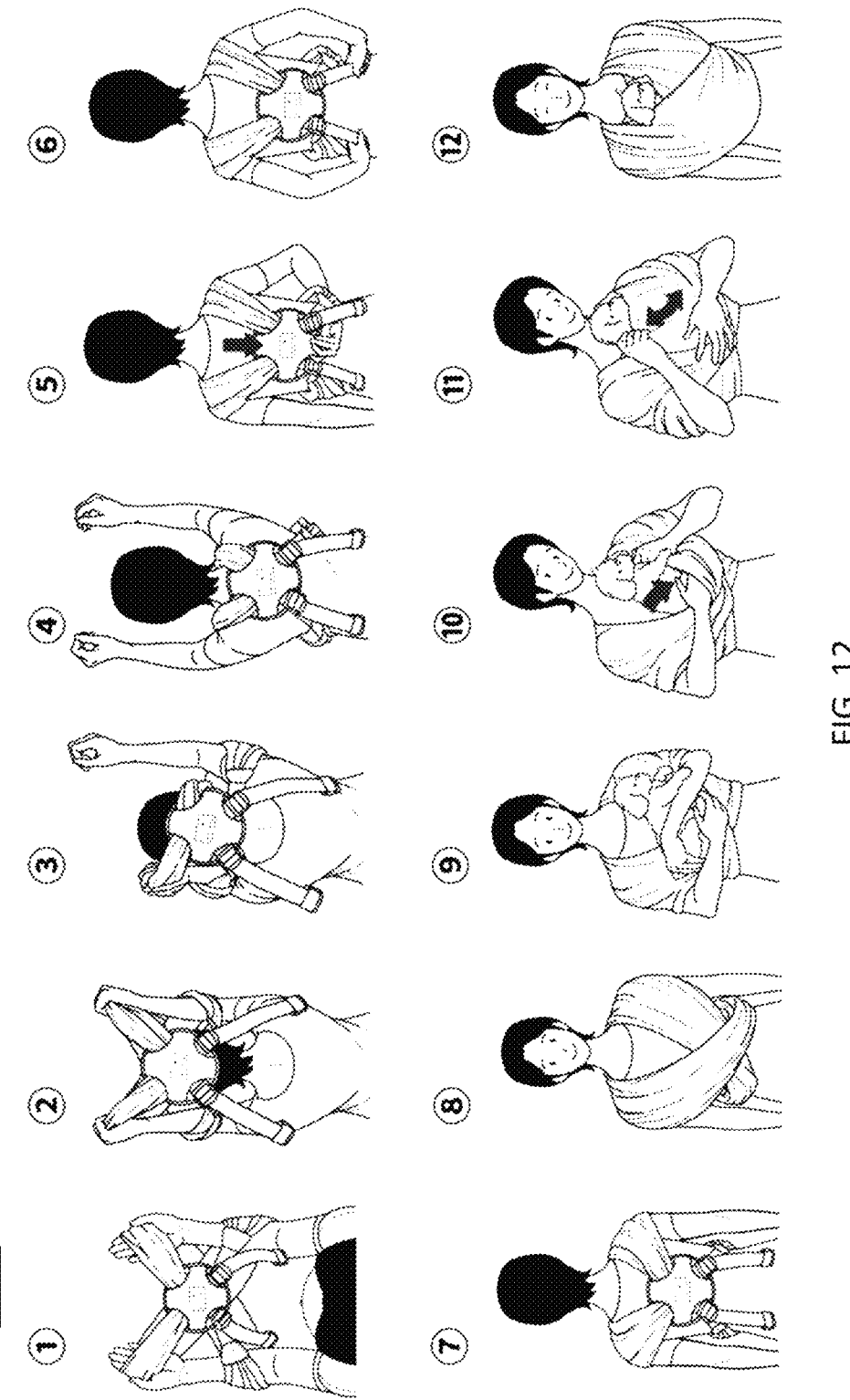
FIG. 12 shows the method to wear the sling carrier and secure the pet in the slings according to the present invention.

Still in the alternative embodiment, the present invention provides a method 100" for wearing a carrier 100 and securing and carrying a pet 200 or a baby 200' as shown in FIG. 12. The carrier 100 includes a connecting panel 30, a first sling 10, a first adjustable strap 40, a second sling 20, and a second adjustable strap 50. The method 100" includes the steps of: pulling a carrier 100 over a head of a wearer 300 such that the connecting panel 30 is centered vertically on a back of the wearer 300 and the first and second slings 10, 20 crisscross on a front torso of the wearer 300; and placing the pet 200 or the baby 200' in the first sling 10 and covering the pet 200 or the baby 200' with the second sling 20.

The first sling 10 has a first end 11 and a second end 12, and the first end 11 of the first sling 10 is fixedly attached to an upper left part of the connecting panel 30. The first adjustable strap 40 has a first end 41 and a second end 42, where the first end 41 of the first adjustable strap 40 is fixedly attached to the second end 12 of the first sling 10, and the second end 42 of the first adjustable strap 40 is fixedly attached to a lower right part of the connecting panel 30. The second sling 20 has a first end 21 and a second end 22, and the first end 21 of the second sling 20 is fixedly attached to an upper right part of the connecting panel 30. In addition, the second adjustable strap 50 has a first end 51 and a second end 52, where the first end 51 of the second adjustable strap 50 is fixedly attached to the second end 22 of the second sling 20, and the second end 52 of the second adjustable strap 50 is fixedly attached to a lower left part of the connecting panel 30.

The method 100" further includes the steps of: spreading the first and second slings 10, 20 over respective shoulders of the wearer 300 like a shawl; adjusting tightness of the first and second adjustable straps 10, 20 by pulling down free ends 46, 56 of the first and second adjustable straps 40, 50; and folding the free end 46 and securing the folded free end 46 in a loop 47.

As shown in FIG. 12, the method 100" for wearing a carrier 100 and securing and carrying a pet 200 or a baby 200' includes the steps of: holding the carrier 100 with both hands, ensuring it is oriented correctly, with the connecting panel 30 of the carrier 100 facing rearward and the slings 10, 20 and the adjustable straps 40, 50 untangled; inserting the wearer's head in the carrier 100; spreading the first sling 10 over the left shoulder and the second sling 20 over the right shoulder, making sure the adjustable straps 40, 50 rest comfortably; adjusting the connecting panel 30; adjusting the length of the adjustable straps 40, 50; adjusting the first sling 10 and placing a pet 200 in the sling 10 so that the sling 10 fold inward, creating a ship-like shape that forms a secure pocket or space for the pet 200, ensuring the pet 200 is positioned comfortably and securely; adjusting the second sling 20 to further wrap around the pet 200; and checking all fastenings and adjustments to confirm that the carrier 100 is stable and securely attached.

While the invention has been shown and described with reference to different embodiments thereof, it will be appreciated by those skilled in the art that variations in form, detail, compositions and operation may be made without departing from the spirit and scope of the invention as defined by accompanying claims.

What is claimed is:

1. A carrier for securing and carrying a pet or a baby, comprising:

a connecting panel;

a first sling having a first end and a second end, wherein the first end of the first sling is fixedly attached to an upper left part of the connecting panel;

a first adjustable strap having a first end and a second end, wherein the first end of the first adjustable strap is fixedly attached to the second end of the first sling, and the second end of the first adjustable strap is fixedly attached to a lower right part of the connecting panel;

a second sling having a first end and a second end, wherein the first end of the second sling is fixedly attached to an upper right part of the connecting panel; and a second adjustable strap having a first end and a second end, wherein the first end of the second adjustable strap is fixedly attached to the second end of the second sling, and the second end of the second adjustable strap is fixedly attached to a lower left part of the connecting panel, wherein the connecting panel is constructed to be symmetrical with respect to a vertical axis, wherein the first and second slings are constructed to criss-cross each other, wherein the first and second adjustable straps are length-adjustable, wherein the connecting panel comprises a base panel, an inner panel, and a cover panel, wherein the inner panel is smaller than the base panel and smaller than the cover panel such that the inner panel is positioned between the base panel and the cover panel to be covered by the base panel and the cover panel, wherein the first end of the first sling, the first end of the second sling, the second end of the first adjustable strap, and the second end of the second adjustable strap are each sewn in between the base panel and the inner panel, and wherein the base panel and the cover panel are sewn together to enclose the inner panel, leaving four openings respectively for allowing passage of the first end of the first sling, the first end of the second sling, the second end of the first adjustable strap, and the second end of the second adjustable strap.

2. The carrier of claim 1, wherein the first and second slings are approximately the same length, and the first and second adjustable straps are approximately the same length when fully extended.

3. The carrier of claim 2, wherein the first and second slings are approximately the same width and made of cotton fabric, wherein the first and second slings are wide enough to wrap around the pet or the baby.

4. The carrier of claim 1, wherein the base panel includes a fabric cover, a soft sponge, and a mesh cover, with the soft sponge positioned between the fabric cover and the mesh cover, wherein the fabric cover, the soft sponge, and the mesh cover are sewn together in such a way to enable the mesh cover to face the back of a wearer.

5. The carrier of claim 1, wherein the first end of the first sling is loosely folded, stacked, and then sewn to upper left part of the connecting panel, and wherein the first end of the second sling is loosely folded, stacked, and then sewn to upper right part of the connecting panel.

6. The carrier of claim 5, further comprising a first attachment part and a second attachment part, wherein the second end of the first sling is loosely folded, stacked, and then sewn to one end of the first attachment part, and the first end of the first adjustable strap is sewn to the opposite end of the first attachment part, wherein the second end of the second sling is loosely folded, stacked, and then sewn to one end of the second attachment part, and the first end of the second adjustable strap is sewn to the opposite end of the second attachment part.

7. The carrier of claim 1, wherein the first adjustable strap comprises a fixed strap portion, an adjustable strap portion, and a buckle, wherein the fixed strap portion of the first adjustable strap is secured to the buckle to maintain a constant length, wherein the adjustable strap portion of the first adjustable strap is threaded through the buckle to allow for length adjustment by pulling a free end of the adjustable strap portion of the first adjustable strap.

8. The carrier of claim 7, wherein the adjustable strap portion of the first adjustable strap is fixedly attached to the second end of the first sling and the fixed portion of the first adjustable strap is fixedly attached to a lower right part of the connecting panel such that the free end of the adjustable strap portion of the first adjustable strap hangs downwardly from the buckle of the first adjustable strap.

9. The carrier of claim 7, wherein the first adjustable strap further comprises a first loop which is vertically sewn to the free end of the adjustable strap portion of the first adjustable strap, wherein the first loop has a length approximately twice of the width of the free end.

10. A method for wearing a carrier and securing and carrying a pet or a baby wherein the carrier includes a connecting panel, a first sling, a first adjustable strap, a second sling, and a second adjustable strap, the method comprising the steps of:

pulling a carrier over a head of a wearer such that the connecting panel is centered vertically on a back of the wearer and the first and second slings crisscross on a front torso of the wearer, and placing the pet or the baby in the second sling and covering the pet or the baby with the first sling, wherein the first sling has a first end and a second end, and the first end of the first sling is fixedly attached to an upper left part of the connecting panel, wherein the first adjustable strap has a first end and a second end, wherein the first end of the first adjustable strap is fixedly attached to the second end of the first sling, and the second end of the first adjustable strap is fixedly attached to a lower right part of the connecting panel, wherein the second sling has a first end and a second end, and the first end of the second sling is fixedly attached to an upper right part of the connecting panel, wherein the second adjustable strap has a first end and a second end, and wherein the first end of the second adjustable strap is fixedly attached to the second end of the second sling, and the second end of the second adjustable strap is fixedly attached to a lower left part of the connecting panel, wherein the connecting panel comprises a base panel, an inner panel, and a cover panel, wherein the inner panel is smaller than the base panel and smaller than the cover panel such that the inner panel is positioned between the base panel and the cover panel to be covered by the base panel and the cover panel, wherein the first end of the first sling, the first end of the second sling, the second end of the first adjustable strap, and the second end of the second adjustable strap are each sewn in between the base panel and the inner panel, and wherein the base panel and the cover panel are sewn together to enclose the inner panel, leaving four openings respectively for allowing passage of the first end of the first sling, the first end of the second sling, the second end of the first adjustable strap, and the second end of the second adjustable strap.

11. The method of claim 10, further comprising the steps of:

spreading the first and second slings over respective shoulders of the wearer, and adjusting tightness of the first and second adjustable straps by pulling down free ends of the first and second adjustable straps.

12. The method of claim 11, further comprising the steps of:

folding the free end and securing the folded free end in a loop.

* * * * *